(12) United States Patent
Green

(10) Patent No.: US 8,684,521 B2
(45) Date of Patent: Apr. 1, 2014

(54) TORIC CONTACT LENSES

(75) Inventor: Timothy Green, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 1734 days.

(21) Appl. No.: 11/614,514

(22) Filed: Dec. 21, 2006

(65) Prior Publication Data

US 2007/0146629 A1  Jun. 28, 2007

Related U.S. Application Data

(60) Provisional application No. 60/753,004, filed on Dec. 22, 2005.

(51) Int. Cl.
*G02C 7/04* (2006.01)
*B29C 33/00* (2006.01)
*B29C 33/38* (2006.01)
*B29L 11/00* (2006.01)

(52) U.S. Cl.
CPC ............. *G02C 7/041* (2013.01); *B29C 33/3842* (2013.01); *B29L 2011/0025* (2013.01); *G02C 2202/08* (2013.01)
USPC ...................................... 351/159.21; 264/2.5

(58) Field of Classification Search
CPC .......... G02C 7/041; G02C 7/04; G02C 7/048; G02C 2202/08; B29C 33/3842; B29L 2001/0025
USPC .............. 351/159–160 R, 160 R–160 H, 176, 351/159.21; 623/4.1–6.64
See application file for complete search history.

(56) References Cited

U.S. PATENT DOCUMENTS

| 2,021,812 | A | * | 11/1935 | Sterling | .................. 351/176 |
| 4,508,436 | A | | 4/1985 | Sitterle | |
| 4,573,774 | A | | 3/1986 | Sitterle | |
| 5,020,898 | A | * | 6/1991 | Townsley | .................. 351/160 R |

(Continued)

FOREIGN PATENT DOCUMENTS

| EP | 0614105 B1 | 11/1996 |
| EP | 0742461 A2 | 11/1996 |
| FR | 2281584 A | 3/1976 |
| WO | WO 89/07303 A1 | 8/1989 |

OTHER PUBLICATIONS

International Standard, "ISO 18369-1," Ophthalmic Optics—Contact Lenses—Part 1, 1 ed., (p. 1-48), (Aug. 15, 2006).

(Continued)

*Primary Examiner* — Zachary Wilkes
(74) *Attorney, Agent, or Firm* — Toan P. Vo; Jeffrey B. Powers

(57) ABSTRACT

A set of toric contact lenses, where each lens in the set includes a posterior surface and an anterior surface. For each lens in the set, at least one of the posterior and anterior surfaces includes a toric optical zone. Each lens in the set has a common effective base curve and a common overall diameter, but a different cylindrical correction. Lenses in the set have a peripheral zone and a blend zone disposed between the peripheral zone and the toric optical zone. In lenses of such a set, the width of said blend zone at a common location on at least two of the lenses are selected to be different so that the thicknesses at a common position on the lenses are substantially the same for all lenses in the set.

23 Claims, 3 Drawing Sheets

(56) References Cited

U.S. PATENT DOCUMENTS

| | | |
|---|---|---|
| 5,455,641 A | 10/1995 | Hahne et al. |
| 5,601,759 A | 2/1997 | Apollonio |
| 5,611,970 A | 3/1997 | Apollonio et al. |
| 5,650,838 A * | 7/1997 | Roffman et al. ............... 351/177 |
| 6,113,236 A * | 9/2000 | Chapman et al. ......... 351/160 R |
| 6,241,355 B1 | 6/2001 | Barsky |
| 6,457,826 B1 * | 10/2002 | Lett ............................... 351/161 |
| 6,595,639 B1 | 7/2003 | Ho et al. |
| 7,052,133 B2 * | 5/2006 | Lindacher et al. ............ 351/161 |
| 2004/0233382 A1 * | 11/2004 | Lindacher et al. ........ 351/160 R |

OTHER PUBLICATIONS

Ames et al., "Factors Influencing Hydrogel Toric Lens Rotation," ICLC, Jul./Aug. 1989, (vol. 16), (Issue. 7-8), (p. 221-225).

* cited by examiner

TORIC CONTACT LENSES

CROSS-REFERENCE

This application claims the benefit of Provisional Patent Application No. 60/753,004 filed Dec. 22, 2005.

FIELD OF INVENTION

The present invention relates to toric contact lenses, and more particularly to series of toric contact lenses.

BACKGROUND OF THE INVENTION

Contact lenses having a toric optical zone (commonly referred to as "toric contact lenses") are used to correct refractive abnormalities of the eye associated with astigmatism. The toric optical zone provides cylindrical correction to compensate for astigmatism. Since astigmatism that requires vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. A toric surface is formed on either the posterior lens surface (to achieve a "back surface toric lens") or the anterior lens surface (to form a "front surface toric lens").

Whereas spherical contact lenses may freely rotate on the eye, toric contact lenses have a stabilization structure to inhibit rotation of the lens on the eye so that the cylindrical axis of the toric zone remains generally aligned with the axis of the astigmatism. For example, a stabilization structure may comprise one or more sections of the lens periphery which are thicker (or thinner) than other sections to provide the stabilization. For example, a ballast is a thick portion that will assume a downward position when a lens is inserted in an eye, and the ballast axis of a lens extends in the up and down direction when a lens assumes its position on the eye. Other stabilization structures are known in the art. Regardless of the structure of the stabilization structure, the axis that extends in the up and down direction when a lens assumes its position on the eye will be referred to herein as the ballast axis.

Toric contact lenses are manufactured with a selected relationship (referred to herein as offset) between the cylindrical axis of the toric optical zone and the orientation of the stabilization structure. This relationship is expressed as a number of degrees that the cylindrical axis is offset from the ballast axis. Accordingly, toric contact lens prescriptions specify offset, with toric lenses generally being offered in 5 or 10-degree increments ranging from 0 degrees to 180 degrees.

In summary, a prescription for a toric contact lens will typically specify spherical correction, cylindrical correction and offset to define the optical correction, as well as an overall lens diameter and base curve to define fitting parameters.

In prescribing a patient with a toric contact lens, practitioners conventionally use sets of diagnostic contact lenses that consist of a selected subset of a series of lenses, to determine which lens in the series will provide appropriate fitting characteristics and optical correction. For example, a series may comprise lenses of a common spherical power but different cylindrical powers.

It is desirable that lenses in such a series (including the lenses of a fitting set) have consistent fitting characteristics over the range of optical corrections of the series. However, a problem with toric contact lenses is that, in order to provide a series of toric lenses over a range of cylindrical corrections, thicknesses of the lenses in the series will typically vary considerably based on cylindrical correction; for example, for a series in which lenses have a common spherical power, lenses having higher cylindrical correction will have greater thicknesses in at least one portion of the lenses. This ultimately results in lenses in the series having different fitting characteristics, thereby affecting, for example on-eye comfort or lens stability at certain cylindrical corrections.

Thus, a lens series which provides consistent fitting characteristics over a range of spherical and cylindrical corrections is highly desirable. The term "set" will be used herein below to refer to a complete series or a subset thereof.

SUMMARY

Aspects of the present invention are directed to a set of toric contact lenses, each lens in the set including a posterior surface and an anterior surface; for each lens, at least one of said surfaces including a toric optical zone, and each lens in the set having a common spherical correction but different cylindrical correction; each lens in the set has a peripheral zone and a blend zone disposed between the peripheral zone and the toric optical zone, the widths of said blend zone at a common location on at least two of the lenses being different than one another.

In some embodiments the perimeter of the toric optical zone of at least one of the lenses is circular. The toric optical zone may be circular for all lenses in the set. In some embodiments, the perimeter of the toric optical zone is oval. The toric optical zone may be oval for all lenses in the set. In some of the embodiments, each of the lenses in a set has a ballast and a ballast axis, and the widths of the blend zones for each of the lenses vary as a function of the angular separation from the ballast axis.

In some embodiments, the thicknesses at a common position on the lenses are substantially the same for all lenses in the set. In some embodiments, the thicknesses at the common position differ by no more than 0.2 mm. In some embodiments, the common position is disposed in a blend zone of at least some of the lenses in the set. The common position may be disposed at the top of the anterior optical zone of the lenses. In some embodiments, all of the lenses in the set have a same optical zone minimum diameter as one another. (It will be understood that lenses with a circular optical zone only have a single diameter.) In some embodiments, the cylindrical power of the lenses in the set ranges from at least −0.75 diopters to at least −2.75 diopters.

Another aspect of the invention directed to a set of mold tools. The set comprises a plurality of first mold tools, each of the plurality of first mold tools being configured to produce a first surface of one of a plurality of lenses, the first surface having a blend zone of a selected width. The first surfaces are all anterior surfaces or all of the first surfaces are posterior surfaces, said first surfaces all being toric. The set also comprises at least one second mold tool. Each of the at least one second mold tools is configured to produce a second surface of at least one of the plurality of lenses. The plurality of first mold tools and the at least one second mold tools are configured such that combinations of the at least one second mold tool with ones of the plurality of first mold tools are capable of producing a set of lenses of having a common spherical correction with the other lenses in the set and different cylindrical powers, the widths of the blend zones at a common location on at least two of the lenses being different than one another.

Dimensions described herein refer to dimensions of a finished contact lens.

The term "effective base curvature" is defined herein to mean the average radius of curvature of the posterior surface calculated over the entire posterior surface, including the periphery.

As used herein the term "increasing power" means increase magnitude of power. Accordingly, increasing power can refer to an increase in negative power as well as an increase positive power. It will be appreciated that both an increase in magnitude of positive power and an increase in magnitude of negative power will cause an increase in surface curvature.

As defined herein the term "monotonically increasing" describes a parameter that increases, and never decreases, but may remain the same for two or more lenses of the set that have different cylindrical power.

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Figure 1:
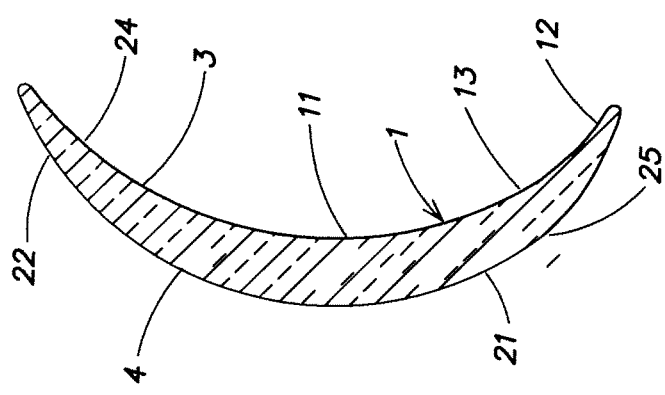
FIG. 1 schematically illustrates an example of an embodiment of a toric contact lens of a lens in a set according to aspects of the present application.

FIG. 1 schematically illustrates an example of an embodiment of a toric contact lens 1 of a lens in a set according to aspects of the present application. Central zone 11 (also referred to herein as an optical zone) of posterior surface 3 is toric, i.e., this zone has a toric surface that provides a desired cylindrical correction, and may include spherical power. It is to be appreciated that a toric surface may be specified using terms of any suitable order. Posterior surface 3 includes a peripheral zone 12 surrounding the central toric zone 11, and a blend zone 13 disposed between the peripheral zone 12 and central toric zone 11. The blend zone is a non-optically corrected region that provides a more gradual transition from the central toric zone 11 to the peripheral zone 12 than would occur if the central toric zone were immediately adjacent to peripheral zone 12.

A central zone 21 of an anterior surface 4 of toric contact lens 1 is spherical. The curvature of central zone 21 is selected such that central zone 21 in combination with central zone 11 provides a desired spherical correction of the lens. Anterior surface 4 includes at least one peripheral curve 22 surrounding central zone 21. It is to be appreciated that although the illustrated lens has a posterior surface that is toric, according to aspects of the present invention, the anterior and/or posterior surfaces may be toric.

As described above, toric lenses are provided with a stability feature so that the lenses maintain a desired rotational orientation on the eye. As one example, FIG. 1 schematically shows a lens 1 that includes a prism ballast wherein peripheral section 24 has a different thickness than an opposed peripheral section 25 of the lens periphery. (Section 25 is at a "bottom" portion of the lens, since, when this type of toric lens is placed on the eye, the prism ballast is located downwardly.) The ballast is oriented about an axis, referred to herein as the "ballast axis." As discussed above, toric contact lens prescriptions define an offset of the ballast axis from the cylindrical axis of the toric zone by a selected angle. The term "offset" is inclusive of angles of 0 degrees or 180 degrees, which describe lenses in which the cylindrical axis is coincident with the ballast axis.

The thickness profile of a toric contact lens (i.e., the thickness for a plurality of contiguous points along a radius of the lens) strongly influences fitting characteristics, such as on eye comfort and lens stability. As mentioned above, it is desirable that a set of contact lenses exhibit consistent fitting characteristics, and it is of course desirable that contact lenses are comfortable to a wearer.

The thickness of the contact lens at any nominal position (i.e., a point) along its profile is affected by several factors, including spherical correction, cylindrical correction, offset, center thickness and the ballast. Thus, for a set of contact lenses having different cylindrical corrections (but similar fitting characteristics such as a common effective base curve and overall diameter), the thickness at least one position of the contact lens will vary. According to aspects of the present invention, a blend zone having appropriately selected cross-sectional profile can have a considerable effect on fitting characteristics. In particular, comfort associated with the lenses of a given set of lens can be improved by varying the width of the blend zone for the various lenses of the set. That is, for a given set of lenses having a common spherical correction and different cylindrical corrections, by varying the width of the blend zone of the lenses of a set based on cylindrical correction, comfort can be improved. In some embodiments, the shape of the blend zones (e.g., the blend zone curvature in a cross section through a diameter of a lens) is the same for all lenses in a set independent of the width the blend zone. However, the shape of the blend zones for one or more of the lenses may also be adjusted based on cylindrical correction (e.g., a cross section of a blend zone may have a greater or lesser curvature depending on the cylindrical correction).

The present invention is based on several factors. As mentioned above, it is desirable that lenses in such sets have consistent fitting characteristics over a range of optical corrections. Further, portions of a lens distal from the center of a lens typically have a larger effect on the fitting characteristics of the lens than regions nearer the optical axis of the lens. In particular, portions of the lens at or between the outer portions of a central zone 11 and inner portions of the peripheral zone (e.g., in a blend zone 13 or an inner edge of the peripheral zone 12) have a large effect on comfort.

Although spherical correction, cylindrical correction, and offset affect thickness profile, these parameters are dictated by the refractive error of a patient's eye, and therefore, from a lens design perspective, these parameters are typically selected in order to correct the refractive error.

The Applicant has found, however, that by varying the width (and possibly shape) of the posterior and/or anterior blend zones, based on the cylindrical correction of a toric contact lens, the thickness profile of the lens can be maintained fairly constant over a set of lenses, including lenses having a range of cylindrical corrections. In other words, in a set of contact lenses having different cylindrical corrections, the thicknesses of lenses in the set in the regions of particular impact on comfort can be maintained more consistent across the set.

Aspects of the present invention are directed to a set of toric contact lenses, where each lens in the set includes a posterior surface and an anterior surface. For each lens in the set, at least one of the posterior and anterior surfaces includes a toric optical zone. In some embodiments, each lens in the set has a common effective base curve and a common overall diameter, but a different cylindrical correction. Lenses in the set have a peripheral zone and a blend zone disposed between the peripheral zone and the toric optical zone. In lenses of such a set, the width of said blend zone at a common location on at least two of the lenses are selected to be different so that the thicknesses at a common position on the lenses are substantially the same for all lenses in the set.

Figure 2B:
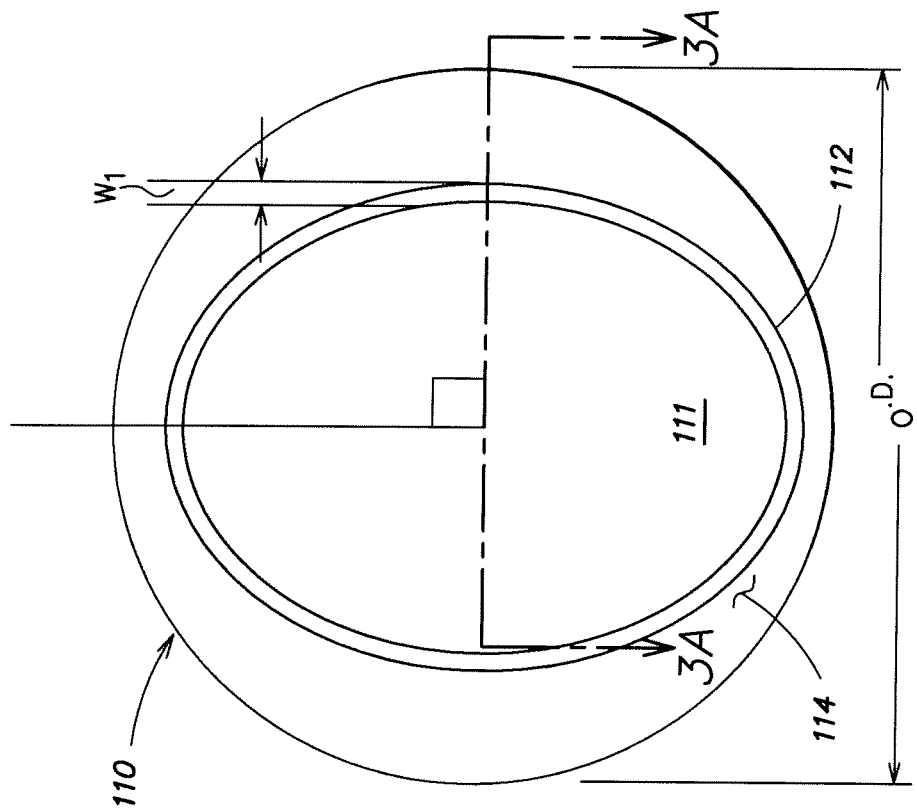
FIGS. 2A and 2B are plan views of two examples of lenses of a set having blend zones of different widths according to aspects of the present invention, the two lenses having different cylindrical powers.
Figure 2A:
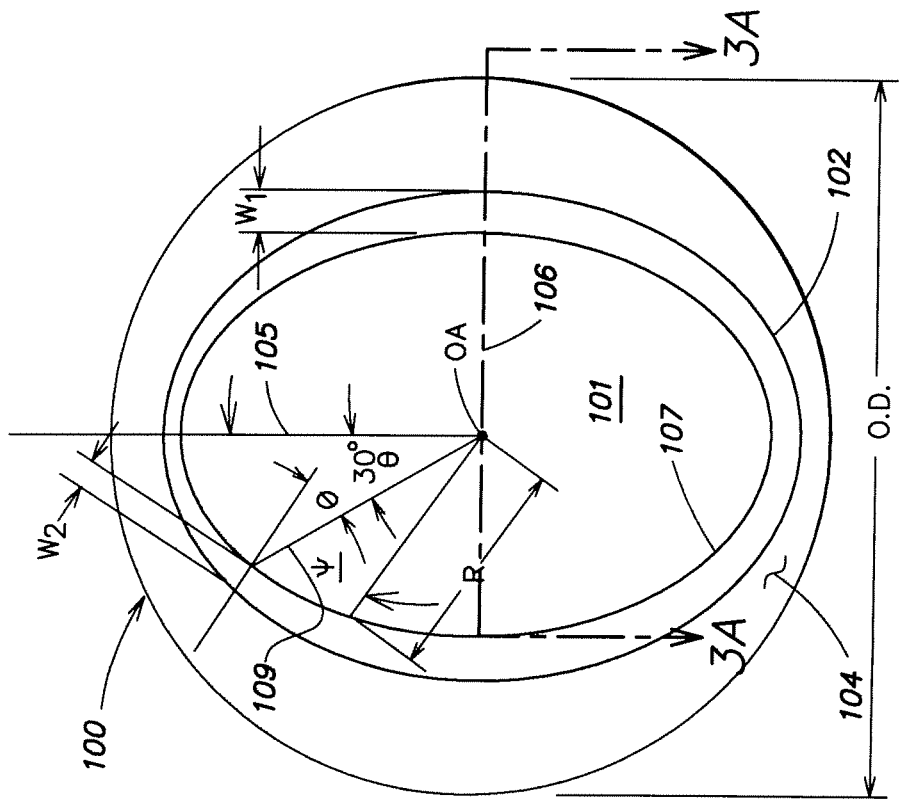

FIGS. 2A and 2B are plan views of two exemplary surfaces of lenses 100 and 110 of a set of lenses having blend zones 102 and 112, respectively. Each lens comprises a corresponding toric zone 101, 111, a corresponding peripheral zone 104, 114 and a corresponding blend zone 102, 112. Each lens has an overall diameter O.D.

Blend zones 102 and 112 have different widths than one another at one or more selected common locations. For lenses having a common offset (e.g., 90 degrees in FIGS. 2A and 2B), locations of the blend zone may be specified by an angular separation ($\theta$) from the ballast axis 105. For example, for lens 100, along line 105 the angular separation $\theta$ equals zero degrees; and for line 109 angular separation $\theta$ equals thirty degrees.

Figure 3A:
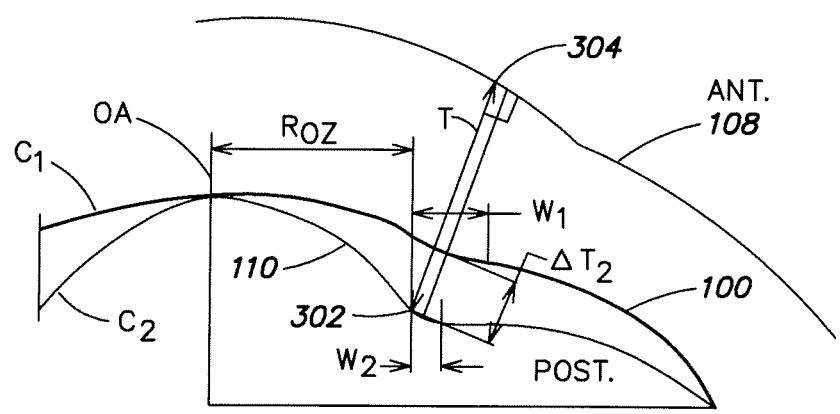
FIG. 3A illustrates superimposed partial cross-sectional side views of the two contact lenses in FIGS. 2A and 2B taken along lines 3A-3A in FIGS. 2A and 2B, respectively.

A blend zone width for a given angular separation $\theta$ is measured on a line perpendicular to the interior perimeter 107 of the blend zone. Accordingly, as illustrated in FIG. 2A, width $W_1$ is measured along line 106, and width $W_2$ is measured at an angle $\varnothing$ relative to radial line 106. As illustrated in FIG. 3A, widths W are measured in a plane perpendicular to optical axis OA.

Referring again to FIGS. 2A and 2B, toric zones 101 and 111 can have any suitable perimeter shape (e.g., elliptical, oval or circular). It is to be appreciated that for a given lens, the width W of a blend zone may be constant around the lens (i.e., measured at locations at various angular separations $\theta$ from ballast axis 105) or can vary as a function of $\theta$ (e.g., $W_1$ is not equal to $W_2$). As illustrated in FIG. 2A, example width $W_1$ is greater than example width $W_2$. It is to be appreciated that to vary as a function of $\theta$, a width need only be different at two locations around the perimeter of the blend zone. For example, the width of a blend zone of a given lens at $\theta$ equals zero degrees may be different than the width of the blend zone at $\theta$ equals 90 degrees. In some embodiments, the width of the blend zone varies continuously with $\theta$.

It will be appreciated that according to aspects of the present invention, the widths at a common location on a lens (i.e., a same angle $\theta$) on at least two of the lenses (e.g., lenses 100 and 110) in a set are selected to be different. In some embodiments, the widths are selected based on cylindrical correction such that the thicknesses at a selected position are substantially the same for all lenses in the set. A position is specified by $\psi$ measured form the ballast axis and R measured from the optical axis OA. Thickness measurement is discussed in greater detail below with reference to FIGS. 3A-3C. It is to be appreciated that $\psi$ (corresponding to the common position) and $\theta$ (corresponding to the width measurement location) may or may not be equal to one another. That is to say that by varying width at one location may have an impact on a thickness at another location. Although the separation between $\theta$ and $\psi$ will typically be relatively small, the separation is shown as relatively large in FIG. 2A to facilitate discussion. Further, the common location may be disposed in the blend zone. However, it is not necessary that a common location according to aspects of the invention be disposed in a blend zone.

FIG. 3A illustrates superimposed partial cross-sectional side views of two the contact lenses 100, 110 of FIGS. 2A and 2B. The lenses have blend zone widths $W_1$, $W_2$ selected based on cylindrical power. Lenses 100 and 110 have equal optical zone semidiameters $R_{OZ}$ at a given angle $\theta$; however, the invention is not so limited and lenses in a set may have different optical zone semidiameters. The curvatures $C_1$ and $C_2$ correspond to lenses in a set having a lesser cylindrical correction and a greater cylindrical correction, respectively. A thicknesses T, is specified by a position on the anterior surface (regardless of which surface(s) are toric) and is measured perpendicular to anterior surface 108, from the anterior surface to a point on the posterior surface. For a given lens, the common location may be located in any of an optical zone, a peripheral zone and a blend zone on the anterior surface of a lens, and the corresponding point on posterior surface may be located in any of an optical zone, a peripheral zone and a blend zone on the posterior surface of that lens. For example, the common location may correspond to an optical zone on the anterior side of a lens of the set, and may correspond to a point in the blend zone on the posterior surface of that lens. The term "corresponding point," as used above, refers to the point on the posterior surface of a given lens (e.g., point 302 on lens 110) that is used (in combination with the point 304 that is at the common position) to define the thickness T at the common position (i.e., the point is on the line that is perpendicular to the anterior surface).

As discussed above with reference to FIG. 2A, widths W are measured in a plane perpendicular to optical axis OA. A thickness $\Delta T_2$ exists between lens 100 and lens 110 due to the selected widths $W_1$ and $W_2$.

Figure 3B:
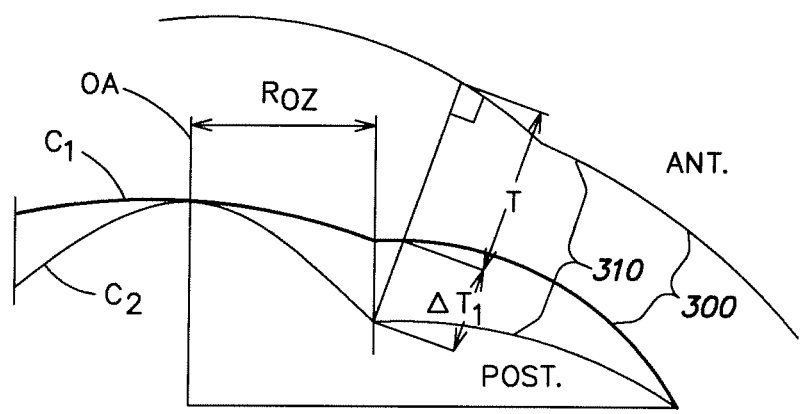
FIG. 3B illustrates superimposed partial cross-sectional side views of two conventional contact lenses both having no blend zones.

FIG. 3B illustrates superimposed, partial, cross-sectional side views of two conventional contact lenses 300 and 310 both having no blend zones. It is to be appreciated that thickness $\Delta T_1$ is greater than thickness $\Delta T_2$.

Figure 3C:
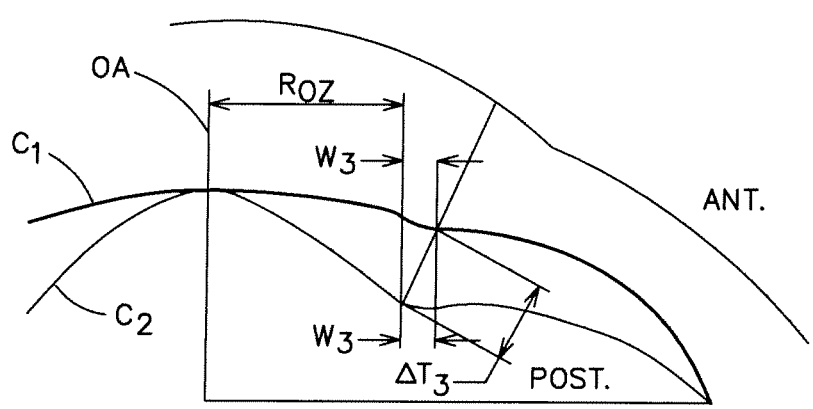
FIG. 3C illustrates superimposed partial cross-sectional side views of two conventional contact lenses both having blend zones of equal width.

FIG. 3C illustrates superimposed, partial, cross-sectional side views of two conventional contact lenses both having blend zones of equal width. It is to be appreciated that thickness $\Delta T_3$, while it may be less than $\Delta T_1$, is greater than thickness $\Delta T_2$.

A set in which lenses have blend zone widths W selected according to cylindrical power provides several advantages. Examples of advantages of such a set include that fitting characteristics of the lenses may be more consistent for the lenses of the set, and on-eye comfort of the lenses may be improved. Aspects of the present invention are applicable for toric contact lenses having any suitable cylindrical corrections. For example, the lenses may range from at least -0.75 diopter to at least -2.25. In some embodiments, the lenses may range from -0.75 diopters to -2.75, and even up to -3.75 diopter or -4.25 diopter or greater.

Each lens in a set will preferably have a thickness at a selected position that is not more than 0.2 mm different than other lenses in the set, and in some embodiments no more than 0.15 mm, and in other embodiments, no more than 0.1 mm. However, substantial lens stability benefits have been established by reducing the variation in the thickness at the selected position is not more than 0.05 mm different than other lenses in a set. In some embodiments, the selected position is located in a blend zone or at the edge of the central zone or the edge of the peripheral zone. In some embodiments, the thicknesses at all positions on each of the lenses in a set are not more than 0.2 mm different than other lenses in the set.

In some embodiments, each lens in the set will have a maximum thickness at a top of the optical zone of 0.2 mm. For example, such a maximum thickness is appropriate for lenses made of alphafilcon A. However, for other materials (e.g., balafilcon A) a maximum thickness of 0.14 mm is appropriate. Also, generally each lens will have a maximum thickness in the ballasted area of 0.5 mm, more preferably 0.4 mm. For example such a maximum thickness in the ballasted area is appropriate for both alphafilcon A and balafilcon A.

Each lens in the set will preferably have a posterior optical zone diameter of 6.5 to 10 mm, more preferably 7 to 8 mm, and an anterior optical zone diameter of 6.5 to 10 mm, more preferably, 6.5 to 9 mm.

It has been found that, generally, the greatest variation in thickness profile among lenses in the set will be center thickness. (Center thickness is the thickness of the lens at its geometric center, i.e., at the optical axis.) Nonetheless, center thickness will generally not vary more than about 0.2 mm among lenses in the set, and preferably no more than about 0.15 mm. It is preferred that each lens in the set has a maximum ballast thickness that is not more than 0.05 mm than other lenses in the set, preferably not more than 0.03 mm. It is also preferred that the each lens in the set has a maximum thickness at a top of the optical zone that is not more than 0.05 mm than other lenses in the set, preferably not more than 0.03 mm.

Figure 5:
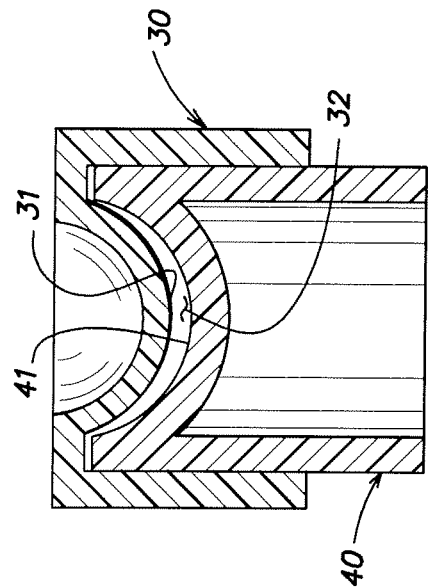
FIG. 5 is a schematic cross-sectional view of an assembled mold assembly shown in FIG. 4.
Figure 4:
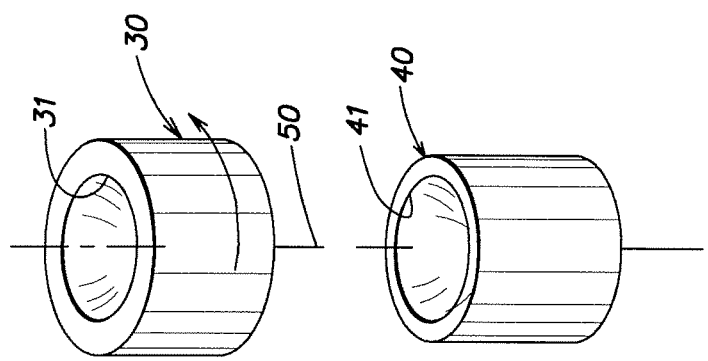
FIG. 4 is a schematic view of one embodiment of a mold assembly for cast molding contact lenses.

According to some embodiments, the lenses of this invention are cast molded by casting the lenses between two mold sections. However, according to aspects of the invention directed to the design of a lens set the method manufacture is non-essential and any suitable technique of manufacture may be used. An illustrative mold assembly is shown in FIGS. 4 and 5. The mold assembly includes posterior mold 30 having a posterior mold cavity defining surface 31 which forms the posterior surface of the molded lens (including a toric surface and a blend zone of a selected width), and anterior mold 40 having an anterior mold cavity defining surface 41 which forms the anterior surface of the molded lens. When the mold sections are assembled, a mold cavity 32 is formed between the two defining surfaces that corresponds to the desired shape of the contact lens molded therein. Each of the mold sections is injection molded from a plastic resin in an injection molding apparatus.

In the illustrated embodiment, the posterior mold cavity defining surface 31 has a toric central zone for forming a toric posterior surface of the toric contact lens that has a cylindrical axis, and anterior mold cavity defining surface 41 has a configuration that will provide ballast to a lens molded in molding cavity 32. Surfaces 31, 41 also include curves for forming desired peripheral curves on the lens, and any blend zone. Central zones of surfaces may be designed to provide a desired cylindrical and spherical correction to the molded toric lens. Although the present example illustrates having a plurality of posterior tools with a toric optical zone and varying blend zone widths, in some embodiments, a plurality of anterior tools with a toric optical zone and varying blend zone widths may be used to generate a set of lenses. In some embodiments, the anterior blend zone width and the posterior blend zone width may be varied as a function of cylindrical correction.

A set of such mold tools may be used to produce a set of lenses according to aspects of the invention. For example a set of mold tools may comprise a plurality of first mold tools, each of the plurality of first mold tools being configured to produce a first toric surface of one of a plurality of lenses, the surface having a blend zone of a selected width. The first surfaces may all be anterior surfaces or all of the first surfaces may be posterior surfaces.

The set further comprises at least one second mold tool, each of the at least one second mold tools being configured to produce a second surface of at least one of the plurality of lenses. The plurality of first mold tools and the at least one second mold tools being configured such that combinations of the at least one second mold tool with ones of the plurality of first mold tools are capable of producing a set of lenses of having a common spherical correction with the lenses in the set and different cylindrical powers, the widths of the blend zones at a common location on at least two of the lenses being different than one another. The widths of the blend zones at the common location may monotonically increase with increasing cylindrical power. By increasing the widths in such a manner, the effects of increasing cylindrical power on fitting characteristics can be at least partially compensated for.

In molding lenses, the rotational alignment of the anterior and posterior mold sections is adjusted to correspond with the selected offset between the cylindrical axis and the ballast. More specifically, after depositing a curable mixture of polymerizable monomers in anterior mold section 40, posterior mold section 30 may be rotated about axis 50 until alignment of this mold section is adjusted with respect to anterior mold section 40 at the selected rotational position. The mold sections are then assembled, or brought fully together, to assume the configuration shown in FIG. 5 while maintaining the selected rotational position. Alternatively, anterior mold section 40 may be rotated about axis 50 until alignment is adjusted at the selected rotational position, followed by assembling the mold sections while maintaining the selected rotational position. Either of the mold sections may include a notch (or protrusion) which is engageable with a protrusion (or notch, respectively) on a support member of the cast molding system, or other means to ensure that this mold section is aligned at a known position with respect to the support member, and rotation of the mold sections with respect to one another can then be controlled to ensure the desired rotational position is maintained.

Subsequent to assembling the mold sections, the monomer mixture is polymerized, such as by exposure to UV light or heat, followed by disassembling the mold assembly and removing the molded lens therefrom. Other processing steps which may be included, depending on the specific process, include lens inspection, hydration in the case of hydrogel contact lenses, and lens packaging. An advantage of this cast molding method is that it minimizes the unique number of tools to cast mold lenses having different axes offsets.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. A set of toric contact lenses, each lens in the set including a posterior surface and an anterior surface, for each lens at least one of said surfaces including a toric optical zone, each lens in the set having a common spherical correction but different cylindrical corrections, and each lens in the set having a peripheral zone and a blend zone disposed between the peripheral zone and the toric optical zone, the widths of said blend zone at a common location on at least two of the lenses being different than one another.

2. The set of lenses of claim 1, wherein the perimeter of the toric optical zone is circular.

3. The set of lenses of claim 1, wherein the perimeter of the toric optical zone is oval.

4. The set of lenses of claim 1, wherein each of the lenses has a ballast and a ballast axis, and wherein the widths of the blend zones for each of the lenses vary as a function of the angular separation from the ballast axis.

5. The set of lenses of claim 1, wherein the thicknesses at a common position on the lenses are substantially the same for all lenses in the set.

6. The set of lenses of claim 2, wherein the common location is disposed in a blend zone of at least some of the lenses.

7. The set of lenses of claim 1, wherein all of the lenses in the set have a same optical zone minimum diameter as one another.

8. The set of lenses of claim 1, wherein the cylindrical power of the lenses in the set ranges from at least −0.75 diopters to at least −2.75 diopters.

9. The set of lenses of claim 5, wherein the thicknesses at the common position differ by no more than 0.2 mm.

10. The set of lenses of claim 5, wherein the thicknesses at the common position differ by no more than 0.15 mm.

11. The set of lenses of claim 5, wherein the thicknesses at the common position differ by no more than 0.05 mm.

12. The set of lenses of claim 9, wherein the common position is disposed in the blend zone of at least some of the lenses.

13. The set of lenses of claim 9, wherein the common position is disposed at the top of the anterior optical zone of the lenses.

14. The set of lenses of claim 1, wherein the widths of the blend zones at the common location monotonically increase with increasing cylindrical power.

15. A set of mold tools, comprising:

a plurality of first mold tools, each of the plurality of first mold tools being configured to produce a first surface of one of a plurality of lenses, the surface having a blend zone of a selected width, the first surfaces all being anterior surfaces or all of the first surfaces being posterior surfaces, said surfaces all being toric; and at least one second mold tool, each of the at least one second mold tools being configured to produce a second surface of at least one of the plurality of lenses, the plurality of first mold tools and the at least one second mold tools being configured such that combinations of the at least one second mold tool with ones of the plurality of first mold tools are capable of producing a set of lenses of having a common spherical correction with the other lenses in the set and different cylindrical powers, the widths of the blend zones at a common location on at least two of the lenses being different than one another.

16. The set of molds of claim 15, wherein the cylindrical power of the set of lenses ranges from at least −0.75 diopters to at least −2.75 diopters.

17. The set of molds of claim 15, wherein the thicknesses of the set of lenses measured at a second common position differ by no more than 0.2 mm.

18. The set of molds of claim 17, wherein the second common position is disposed at the top of the anterior optical zone of the lenses.

19. The set of molds of claim 15, wherein the plurality of first mold tools comprises at least three tools.

20. The set of molds of claim 15, wherein the plurality of first mold tools comprises at least four tools.

21. The set of molds of claim 15, wherein the plurality of first mold tools comprises at least five tools.

22. The set of molds of claim 15, wherein the plurality of first mold tools comprises at least six tools.

23. The set of molds of claim 15, wherein the widths of the blend zones at the common location monotonically increase with increasing cylindrical power.

* * * * *